(12) United States Patent
Can et al.

(10) Patent No.: US 8,118,896 B2
(45) Date of Patent: *Feb. 21, 2012

(54) COATED ABRASIVE MATERIALS AND METHOD OF MANUFACTURE

(76) Inventors: Antionette Can, Sunward Park (ZA);
Anna Emela Mochubele, Benoni (ZA);
Geoffrey John Davies, Randburrg (ZA);
Johannes Lodewikus Myburgh, Helderkruin (ZA)

( * ) Notice: Subject to any disclaimer, the term of this patent is extended or adjusted under 35 U.S.C. 154(b) by 1042 days.

This patent is subject to a terminal disclaimer.

(21) Appl. No.: 11/578,861

(22) PCT Filed: Sep. 21, 2005

(86) PCT No.: PCT/IB2005/002795
§ 371 (c)(1),
(2), (4) Date: Sep. 28, 2007

(87) PCT Pub. No.: WO2006/032982
PCT Pub. Date: Mar. 30, 2006

(65) Prior Publication Data
US 2008/0168717 A1 Jul. 17, 2008

(30) Foreign Application Priority Data
Sep. 23, 2004 (ZA) .................. 2004/7715

(51) Int. Cl.
*B24B 1/00* (2006.01)
*B24D 11/00* (2006.01)
*B24D 3/02* (2006.01)
*C09C 1/68* (2006.01)
*C09K 3/14* (2006.01)
*B05D 1/40* (2006.01)
*B05D 3/00* (2006.01)
*B05D 3/02* (2006.01)
*B05D 7/00* (2006.01)
*B01J 13/02* (2006.01)

(52) U.S. Cl. .............. 51/295; 51/307; 51/309; 427/212; 427/213.31; 427/215; 427/226; 427/227; 427/228; 427/229; 427/331; 977/773

(58) Field of Classification Search .................... 51/295, 51/307, 309; 427/212, 213.31, 215, 226–229, 427/331; 977/773
See application file for complete search history.

(56) References Cited

U.S. PATENT DOCUMENTS
4,011,064 A 3/1977 Lee et al.
(Continued)

FOREIGN PATENT DOCUMENTS
CN 1471567 1/2004
(Continued)

OTHER PUBLICATIONS
Written Opinion for PCT/IB2005/002795.*
(Continued)

*Primary Examiner* — Patricia L Hailey
(74) *Attorney, Agent, or Firm* — Frommer Lawrence & Haug LLP; Ronald R Santucci (57) ABSTRACT

A method of coating ultrahard abrasive particles having vitreophilic surfaces, or treated to render their surfaces vitreophilic, are coated with an oxide precursor material, which is then heat treated to dry and purify the coats. The heat treated, coated ultrahard abrasive particles are further treated to convert the coats to an oxide, nitride, carbide, oxynitride, oxycarbide, or carbonitride thereof, or an elemental form thereof, or a glass.

36 Claims, 4 Drawing Sheets

U.S. PATENT DOCUMENTS

| | | | |
|---|---|---|---|
| 4,339,281 A | 7/1982 | Chio | |
| 4,951,427 A | 8/1990 | St. Pierre | |
| 5,104,422 A | 4/1992 | St. Pierre | |
| 5,185,012 A * | 2/1993 | Kelly | 51/295 |
| 5,344,526 A | 9/1994 | Nishibayashi et al. | |
| 5,352,254 A * | 10/1994 | Celikkaya | 51/295 |
| 5,474,583 A | 12/1995 | Celikkaya | |
| 5,711,783 A | 1/1998 | Schloh | |
| 6,414,338 B1 | 7/2002 | Anderson | |
| 6,475,254 B1 | 11/2002 | Saak et al. | |
| 2002/0194955 A1 | 12/2002 | Fang et al. | |
| 2003/0093956 A1 * | 5/2003 | Saak et al. | 51/307 |

FOREIGN PATENT DOCUMENTS

| | | |
|---|---|---|
| EP | 0061605 A | 10/1982 |
| EP | 0 402 677 A | 12/1990 |
| EP | 0400322 A1 | 12/1990 |
| EP | 0 503 974 A | 9/1992 |
| EP | 0503974 A | 9/1992 |
| GB | 1213999 | 11/1970 |
| GB | 1318467 | 5/1973 |
| JP | 62-263991 | 11/1987 |
| JP | 03-003776 | 1/1991 |
| JP | 03-024185 A | 2/1991 |
| JP | 4-202490 | 7/1992 |
| JP | 04-202490 A | 7/1992 |
| JP | 05-105560 A | 4/1993 |
| JP | 7-509511 | 10/1995 |
| JP | 09-125110 A | 5/1997 |
| JP | 11-180797 | 7/1999 |
| JP | 2000-501135 A | 2/2000 |
| JP | 2003-055649 | 2/2003 |
| JP | 2003-055649 A | 2/2003 |
| RU | 2 126 735 C | 2/1999 |
| RU | 2146187 C1 | 3/2000 |
| RU | 2 163 222 C | 2/2001 |
| SU | 961281 A | 6/1993 |
| WO | WO 94/02560 | 2/1994 |
| WO | WO 97/20011 A | 6/1997 |
| WO | WO 03/076337 A | 9/2003 |

OTHER PUBLICATIONS

Turova, Nataliya Ya. et al.: "The Chemistry of Metal Alkoxides", Kluwer Academic Publishers, 2002, pp. 107-125.

Office Action for related U.S. Appl. No. 11/547,697, Mailed Dec. 7, 2010.

Office Action for related U.S. Appl. No. 11/547,697, Mailed Aug. 30, 2010.

* cited by examiner

COATED ABRASIVE MATERIALS AND METHOD OF MANUFACTURE

This application is a 371 of PCT/IB2005/002795 filed on Sep. 21, 2005, published on Mar. 30, 2006 under publication number WO 2006/032982 A1 and claims priority benefits of South African Patent Application No. ZA 2004/7715 filed Sep. 23, 2004.

BACKGROUND OF THE INVENTION

THIS invention relates to coated abrasive particles and materials, and to a method of making them.

Abrasive grit, such as diamond and cubic boron nitride particles, are widely used in sawing, drilling, grinding, polishing and other abrasive and cutting applications. In such applications the grit is generally surrounded by a matrix consisting of metals such as Fe, Co, Ni, Cu and alloys thereof (metal bonds). Alternatively, resin (resin bond) or vitreous (vitreous bond) matrices can be used, the choice of matrix being a function of the particular application in which the abrasive is to be used.

The use of abrasive grit in the manufacture of abrasive tools is not without its problems. Vitreous bonded grinding wheel and tools containing ultrahard abrasive particles such as diamond and cubic boron nitride are widely used in general grinding operations. Typically the abrasive particles are held in a porous glass matrix. The tools are made by mixing or combining the ultrahard abrasive particles with glass frits and/or glass forming starting materials, compacting or forming a required shape for the grinding wheel or component of said wheel and then heat treating to a temperature sufficient for the glass to sinter to a desired degree such that a crushable porous matrix is obtained for the abrasive ultrahard particles.

There are several problems that limit the making and use of such abrasive wheels and articles. Firstly, in the case where diamond is the required ultrahard abrasive particle, the temperatures, heat treatment times, and furnace environments used or ideally required are such that significant degradation of the diamond particles can occur due to oxidation. It is well known that diamond oxidation reactions can detectably commence at temperatures as low as 550° C. in air and can become very rapid at temperatures exceeding 800° C. This limits the fabrication procedures to the use of inconvenient and sometimes expensive gaseous environments. Moreover the oxidation reactions of diamond being surface area dependent, become extremely rapid as the diamond abrasive particle size becomes small. This tends to limit the convenient use of diamonds in vitreous bonds to the coarser sizes such as about 100 to 150 micrometers (μm) in diameter although diamond sizes as fine as 1 to 10 μm may be desired for some applications.

It is often desired to incorporate organic compounds and agents into the glass compact so that controlled porosity may be generated by the pyrolysis and thermal degradation of such organics. Even though inert gas environments may be employed this pyrolysis of the organic components leads to highly oxidative products that can oxidize and damage the diamond abrasive particles.

Secondly, in the case where cubic boron nitride particles are the desired ultrahard abrasive, certain glass making components or compounds can inappropriately react with the cubic boron nitride leading to large amounts of gas evolution and foaming that can disrupt and damage the wheel or abrasive article. Examples of these glass components are alkali oxides, such as lithium oxide ($Li_2O$), sodium oxide ($Na_2O$) and potassium oxide ($K_2O$). These components might be desired fluxing agents for the glass sintering and formation. Lithium oxide is known to easily react with cubic boron nitride at elevated temperatures with the evolution of nitrogen gas ($N_2$). This gas evolution and resultant foaming can disrupt the fabrication of a vitreous bonded grinding wheel or article. The glass, vitreous bond choices are thus limited to those that do not contain significant amounts of compounds that can catastrophically react with cubic boron nitride.

This problem is also magnified as the cubic boron nitride particle size becomes smaller due to a large increase in surface area and resultant reactive surface and so there is also a tendency not to employ fine cubic boron nitride particle size distributions.

Thirdly, when mechanical mixtures of the ultrahard particles and the glass frits and/or glass starting material combinations are subjected to the glass sintering and formation conditions, bonding and keying of the abrasive particles into the vitreous matrix can be problematic due to inadequate wetting and contact between the abrasive particle and the glass.

Fourthly, often slow cooling rates are necessary during the manufacture of vitreous bonded tools to minimize cracking damage which can occur due to thermal expansion missmatch between the abrasive grains and the porous glass bond matrix.

Prior art exists where such problems are considered. EP 0,400,322 (also published as U.S. Pat. No. 4,951,427) claims abrasive particles, including diamond and cBN, having a refractory metal oxide substantially covering the surface of said particles. The metal oxide coats were claimed to provide means of substantially eliminating attack on cBN particles from the vitreous bond matrix of grinding wheels during their manufacture. The preferred refractory metal oxides were titania, zirconia, alumina and silica. The most preferred was titania.

The discussed method involves first applying a metal coat in an elemental form to the particles followed by converting said coat into oxides by heat treatment, preferably during firing in oxidizing atmospheres to produce grinding wheels. Although an alternative method for $TiO_2$ involving forming a slurry with a metal organic compound, specifically tetra-isopropyl titanate, and then decomposing the said metal organic by heating is suggested in one of the examples, the example provided is non-enabling, has insufficient details and does not provide a means of coating individual fine particles in chosen phases of titania.

Moreover these procedures are inappropriate as the particle sizes of the desired starting constituents become finer, in particular for micron and submicron particulate materials and more particularly for nano-sized particulate materials, due to significant difficulties in coating each very fine particle evenly and the tendency to form agglomerates of the fine particles. Use of these procedures thus imposes limitations on coating particulate abrasive materials of fine sizes.

In U.S. Pat. No. 4,011,064 it is disclosed that rough granular adherent coats can be applied to cBN abrasive particles by milling the particles with metal compounds in ball mills in such a way that the metal compound may be smeared over the surfaces of the particles. The metal compound can then be decomposed by heating, between about 800 and 1400° C., in inert or reducing atmospheres to convert the metal compound into the metal. The exemplary metal compound disclosed is tungsten sulphide, $WS_2$, resulting in a granular tungsten metal coat on 125 to 149 micron cBN particles.

It is expected that this method would be very difficult to apply to finer particles such as 10 micron or smaller and to not be applicable at all to sub-micron and nano-sized particles due to the requirement that the smeared material must itself be essentially comminuted to particles much smaller than particles to be coated. Moreover the metal compounds applicable in the method are restricted to those that may have appropriate mechanical properties for smearing.

Much of the prior art concerning the problems of abrasive particles to be incorporated into bonded tools and wheels deals with coating the abrasive particles in metals, ceramics and combinations of such materials. This body of prior art predominantly deals with various chemical vapour or physical vapour methods of generating such coats. Moreover it is expected that such techniques are limited and difficult to apply to fine abrasive particles, particularly those of micron, sub-micron and nano-sizes. It is expected that the prior art methods in general suffer from a deficiency in that it is difficult to expose each and every particle to identical reactive and coating environments and so variable coating from particle to particle inevitably ensues.

It remains that efficient methods of coating abrasive particles in materials that would serve to protect the abrasive from chemical attack by the many desired bond materials of grinding wheels and tools, be they vitreous bonds or metal bonds or other, is required. In particular, methods that enable fine sizes of abrasives of micron, sub-micron and even nano-size is required.

SUMMARY OF THE INVENTION

According to one aspect of the invention a method of coating ultrahard abrasive particles includes the steps of providing a plurality of ultrahard abrasive particles having vitreophilic surfaces, coating the ultrahard abrasive particles with an oxide precursor material, and heat treating the coated ultrahard abrasive particles to dry and purify the coats.

The heat treated, coated ultrahard abrasive particles are further treated to convert the precursor material to an oxide, nitride, carbide, oxynitride, oxycarbide, or carbonitride of the oxide precursor material, or an elemental form of the oxide precursor material, or combinations thereof.

The oxide precursor material is preferably an amorphous or a nano-crystalline oxide, hydroxide or oxo-hydroxide.

The ultrahard abrasive particles are preferably selected from the group comprising diamond, cubic boron nitride, silicon carbide, silicon nitride, boron carbide, boron suboxide ($B_6O$) and the like.

In particular, the ultrahard abrasive particles are diamond or cubic boron nitride or a combination of these materials, in which case the particles have to undergo a surface treatment process in order to render the surfaces thereof vitreophilic. This forms a further aspect of the present invention, in terms of which the surface chemical species are chosen and generated by appropriate treatments in order that the surface chemical species so formed may be compatible with and take part in subsequent wet chemical reactions and means of coating the ultrahard particles. Surface chemistries of this nature may be described as being vitreophilic or glass loving, in that they can form bonds with oxide components typical in glass or glass-like amorphous materials. In this way the coat materials are then likely to be chemically bonded to the surface of the ultrahard particles.

The converted oxide precursor materials are typically selected from micron, sub-micron or nano-grain sized oxides, nitrides, carbides, oxynitrides, oxycarbides, carbonitrides or elemental precursor materials, or combinations thereof. They typically include the oxides, nitrides, carbides, oxynitrides, oxycarbides and carbonitrides of aluminium, titanium, silicon, vanadium, zirconium, niobium, hafnium, tantalum, chromium, molybdenum and tungsten and any appropriate combination of these materials. Preferably these oxide precursor materials will be amorphous or nano-grain sized.

Some oxide precursor materials are reducible to elemental forms by suitable treatment. Molybdenum and tungsten oxides are examples of this class of precursor material coat.

The oxide precursor materials are preferably coated onto the ultrahard abrasive particles using a so-called sol-gel technique. The ultrahard particles are suspended in liquid media where chemical reagents, in particular one or more alkoxides, are introduced so that colloidal entities may form and bond to the surfaces and build up into coatings on the said particles. The coats so formed are mainly micro-porous oxides, hydroxides or oxo-hydroxides of the metals or metalloids referred to above.

Temperature controlled heating in air, vacuum or inert gas is preferably carried out to remove volatiles and unwanted chemical species attached to the high surface area of the micro-porous amorphous coats, such as hydroxyl species, in particular —OH.

Further heat treatment or calcinations can be employed to crystallize the coats to form fine grained or nano-size grained oxide ceramics.

As some oxide ceramics undergo phase changes in certain temperature ranges, choice of the particular crystalline phases by the temperature and times employed is a further aspect of the invention.

Temperature controlled reactions in reactive gases may also be employed to convert the amorphous oxides or crystalline oxide ceramics into crystalline non-oxide ceramics. In particular nitrides are formed by reacting the coats with ammonia gas. Carbides may be formed by reacting the coats in mixtures of carbonaceous gases and hydrogen, for example mixtures of methane or ethane and hydrogen. Where some oxide coats are reducible by hydrogen, they may converted into micro or nano-grain sized elements or metals.

A particular aspect of the invention is that due to the amorphous or micro-crystalline nature of the oxide precursor coats, the temperatures required to convert them into chosen ceramics or metals by reaction with gases is significantly lower than the temperatures required for conventional oxide ceramics produced by conventional calcining and melting.

The method of the invention has also opened the way for a host of unique coated ultrahard abrasive materials, particularly those of micron diameter and smaller, more particularly those of sub-micron and nano dimensions. However, unique coated diamond or cubic boron nitride materials of sizes of from a few tens of microns in diameter to several hundreds of microns, which include ceramic coats of specific phase, structure and grain sizes, and in particular nano grained ceramics, are also provided. Examples of such oxide ceramics include, zirconia, $ZrO_2$ of the metastable tetragonal phase, zirconia stabilized structures via compositions such as those containing 3 to 8% yttria and zirconia of the monoclinic phase, and titania, $TiO_2$ of predominantly the anatase or rutile phases. Many of the non-oxide ceramic coats comprising the nitrides, carbides, oxynitrides, oxycarbides, and carbonitrides of some of the transition metals such as of vanadium, niobium, tantalum, hafnium, molybdenum and tungsten producible by the method of this invention are also new. Moreover, some of the oxide coat materials do not crystallize over large ranges of temperature and can thus form dense glasses by vitreous sintering mechanisms. Ultrahard abrasives completely coated in dense predominantly silica, $SiO_2$, based glasses of thicknesses of nano dimensions to a few microns, are unique and can be made by the method of the invention.

Coated ultrahard abrasive particles that are very fine, of micron, sub-micron and nano size dimensions coated in oxide ceramics, non-oxide ceramics such as nitrides, carbides, oxynitrides, oxycarbides, and carbonitrides and metallic elements, molybdenum and tungsten, are unique by virtue of the fine dimensions of the ultra hard particles alone. Moreover, here also, the specific structures and nano grain sizes of the coat materials lend added uniqueness.

BRIEF DESCRIPTION OF THE DRAWINGS

The invention will now be described in more detail, by way of example only, with reference to the accompanying figures in which.

DETAILED DESCRIPTION OF EMBODIMENTS

The invention relates to coated abrasive particles and materials for use in sawing, drilling, grinding, polishing and other abrasive and cutting applications.

Many of the problems in the prior art concerning capabilities of efficiently coating abrasive particles of finer sizes, in particular particles of several microns and smaller, and even more particularly sub-micron and even nano-sized abrasives, are addressed by the present invention. In particular, it has been found that the sol-gel coating of particles in suspension can become progressively more efficient and useful as the particles become smaller and exhibit larger and larger surface areas, whereby surface chemistries can aid in the coating mechanisms themselves. Moreover, the chemical environment of each particle in dynamic stirred suspension can be substantially identical to all others leading to an expectation that the coat on each and every particle will be substantially identical to all others. Thus the particle to particle variation of the coat materials will be minimized.

The ultrahard abrasive particles are preferably selected from the group comprising diamond, cubic boron nitride, silicon carbide, silicon nitride, boron carbide, boron suboxide ($B_6O$) and the like.

The ultrahard abrasive particles are preferably diamond and cubic boron nitride (cBN) from nanometer (nm) to millimeter (mm) dimensions.

The ceramic coats may be porous or fully dense.

The ceramic material of the coats include amorphous and crystalline phases of oxide ceramics. These include the oxides of titanium, silicon, zirconium, aluminium, vanadium, niobium, hafnium, tantalum, chromium, molybdenum and tungsten and the like and any appropriate combination of these materials. The preferred oxides are those of titanium, zirconium, silicon and aluminium.

The non-oxide ceramics include metal nitrides, metal carbides, metal carbonitrides. The preferred nitrides are those of titanium, vanadium, niobium, tantalum, molybdenum and tungsten.

The thickness range of the ceramic coats extends from nanometer (nm) to micrometer (μm) dimensions.

For the purposes of this invention sub-micron particles or grains are defined as having their major diametric dimension between 1 micrometer (1000 nm) and 0.1 microns (100 nm), and nano-sized particles or grains as having their major diametric dimension smaller than 0.1 micron (100 nm).

The method of the invention encompasses generally three procedural components, viz, 1) providing ultrahard abrasive particles with vitreophilic surfaces or, where appropriate, chemically treating the ultrahard abrasive particle surfaces to render them vitreophilic; 2) employing colloidal suspension reaction methods to coat the ultrahard particles with an oxide precursor material; and 3) heat treating the so coated ultrahard particles in gaseous environments to dry and purify the coats and then to convert the coat to chosen oxides (including glasses), nitrides, carbides, oxynitrides, oxycarbides, carbonitrides and metals of chosen phase and composition.

In the first step, the surface chemistry of the ultrahard particulate material is manipulated to provide the particles with a vitreophilic nature. Vitreophilic, "glass loving", is defined as being of such a character that chemical bonds with oxide materials can readily be formed. Treatments that are capable of creating chemical species on the surface required for vitreophilic behaviour of the ultrahard particles include, but are not restricted to, boiling in oxidative acids such as concentrated nitric acid, where appropriate, or exposure to strong oxidizing agents such as hydrogen peroxide solutions or heating in air or oxygen. The surfaces so generated allow the formation and growth of oxide and hydroxide based coatings onto the particulate material and good adherence with the so formed oxide based precursor coatings.

In the second step, colloidal suspension coating of the ultrahard abrasive particles with amorphous and/or nano-grain sized, hydrated oxide precursor materials is employed. It has been found that adaptations of certain colloidal techniques are capable of accurately coating micron, sub-micron and even nano-sized ultrahard material particles. There are two general colloidal routes whereby appropriate coatings can be generated, one depending upon whether aqueous solutions of inorganic salts are used and the other where metal organic compounds are used. A preferred approach for this is the latter sol-gel approach, more preferably sol-gel approaches using the hydrolysis and polycondensation of alkoxides or alcoholates. The precursor coatings generated by this method are micro-porous, amorphous or nano-grain sized hydrated oxides of high surface area. Sol-gel techniques, in particular, are highly versatile and amenable to the control of the heterogeneous nucleation and growth of extremely accurate coats of hydrated oxide precursor materials onto the surfaces of vitreophilic suspended particles, which may be as small as 10 nm in dimensions or even smaller.

The favoured sol-gel approach is to slowly add an alcoholic solution of a metal alkoxide or combination of metal alkoxides to a suspension of ultrahard material particles in a low concentration aliquot of pure water in the same alcohol. Alternatively, an aliquot of water in alcohol is slowly added to a suspension of ultrahard material particles in a solution of alkoxide in alcohol. The metal alkoxides are hydrolyzed by the water to form metal hydroxide monomers, which in turn undergo polycondensation reactions that progressively form hydrated, oxide micro porous materials, referred to in this invention as the oxide precursor materials or coats. By appropriate choice of alcohol type, particularly having the same alkyl groups as the alkoxide(s), concentration of suspended ultrahard particles, concentration of alkoxide solution in the alcohol, the alkoxide water ratio, temperature and the presence or absence of other agents such as acids or bases it is possible to control the formation of a coating of the oxide precursor on the suspended ultrahard particles. Each type of alkoxide used requires specific conditions to be employed to coat the suspended ultrahard particulate material in the desired coat.

An important aspect of this approach is that the byproducts of the alkoxide hydrolysis and polycondensation reactions are water, alcohols and hydroxide species on some of the free surfaces of the coating. All of these byproducts are readily removable by drying and low temperature heat treatment. Moreover the alkoxides themselves are readily available as high purity grades. The alkoxide sol-gel approach thus leads to very pure uncontaminated oxides.

Yet another very important aspect of the method of the invention is that a large scope of mixed precursor oxide materials may be made by simultaneously employing more than one type of alkoxide based upon different metals. In this way the oxide precursor material so generated will be a mixed oxide with the different metals distributed on a molecular scale. Alternatively it is known that alkoxide complexes involving more than one metal can be made, and these alkoxide complexes can also be used in the method of the invention. Consequently the oxides, nitrides and carbides generated by the full use of the method of the invention can include mixed and alloyed phases. Further it is known that mixed metal alkoxide structures can be made. Use of such mixed metal alkoxides also leads to mixed metal precursor oxides and subsequently mixed coating phases.

The use of mixtures of alkoxides or mixed alkoxide complexes also allows the doping of the precursor and subsequent coating materials with sintering and structure modification agents such a yttria, magnesia, and the like. Alternatively, such structure modification agents can be introduced via soluble salts either during the alkoxide based reactions or subsequent to their completion. Examples of such salts include preferably the acetates or nitrates of yttrium or magnesium. A great deal of the established ceramic, cermet and metallurgical material science knowledge can thus be brought to bear in the making of the coating materials via the method of the invention.

After removal from suspension and washing the coated particles are slowly dried by, for example, heating in a vacuum below 100° C. The micro-porous, amorphous coats can further be purified by heating in the temperature range of 300 to 400° C., usually in air or inert atmosphere to remove residual alcohol and water in the micro-porosity and in particular radically reduce hydroxyl (—OH), surface chemistry species which usually terminate the large surface area of the porosity. When relatively thick coats are desired, it is sometimes found that on drying, shrinkage and cracking are produced by capillary forces when alcohol and water evaporate out of the porosity. This effect can be minimized by drying slowly and by the use of so-called drying control chemical additives, DCCA's.

These chemicals cause the pore size distribution in the precursor oxide coats to be larger and more uniform and thus capillary forces are reduced resulting in less tendency to crack. Examples of such DCCA's are oxalic acid and dimethyl formamide, DMF. The latter of these is preferred.

The micro-porous, amorphous or nano-grain sized structure of the precursor coat materials renders them ideal for temperature programmed reaction heat treatments in gaseous reactants in order to form desired fine grained and nano-grain sized ceramic phases or glass phases as the coating material. Indeed where the oxide of the coat is reducible in hydrogen, metallic coats can be generated.

In the third step, temperature programmed reaction heat treatments of the precursor coated ultrahard particles in chosen gaseous environments is employed to partially densify the coat and to convert it to a chosen fine or nano-grain sized ceramic material. Heat treatment in air, oxygen or inert gas may be employed to calcine, densify the coat, and crystallize the coat as a desired oxide phase. Choice of heating rate, top temperature and duration of top temperature is specific to the structure, phase and type of oxide required.

If it is desired to convert the coat into a nitride the dried or air calcined coated material may be heated in dry ammonia at temperatures typically up to 1100° C., although temperatures up to and including those of about 1400° C. may be necessary in certain applications. It has been found that this temperature programmed reaction treatment progressively reduces the coat material and is capable of converting the oxide base coats to stoichiometric and non-stoichiometric nitrides and oxynitrides. Again choice of heating rate, gas flow rates, top temperature and duration of top temperature is specific to the structure, phase and type of nitride required. It has also been found that oxynitride phases can be generated by appropriate choice of the conditions.

If it is desired to convert the coat into a carbide, the dried or calcined coated material may be heated in a mixture of carbonaceous gases such as methane or ethane and hydrogen at temperatures typically below 1200° C., although temperatures up to and including 1500° C. may be necessary in certain applications. Again choice of heating rate, gas flow rate, top temperature and duration of top temperature is specific to the structure, phase and type of carbide required. It has also been found that oxycarbide phases can be generated by appropriate choice of the conditions. Alternatively, it has been found that the nitride coats generated as described above can be converted to carbides by appropriate heat treatment in methane or ethane hydrogen mixtures. Carbonitride phases can be generated by choice of conditions.

Some of the oxide coats may readily be reduced to the corresponding elemental metal by reduction in pure hydrogen. Examples of such coats are tungstic and molybdic oxides, $WO_3$ and $MoO_3$, which may readily be reduced to the metals at low temperatures in the typical range of 500 to 700° C.

A key aspect of the temperature programmed reaction component of the method of the invention is that it was observed that the grain sizes of the resulting oxide, nitride, carbide or metal coatings on the ultrahard particles were often nanometers in dimensions. Moreover another valuable aspect of these heat treatments is that the required temperatures and times to effect the conversions were low and short, respectively, when compared to the temperatures and times required for an alogous conversions of conventional oxide materials made by melt or fusion techniques. In some cases of nitride formation temperatures as much as 400° C. lower were required for the method of the invention as compared to the nitriding of conventional oxide materials. Further the coated ultrahard particles are usually separate and unagglomerated.

The above process steps will now be discussed in more detail with reference to FIG. 1.

1. Surface Treatment of the Ultra-hard Particles to render them Vitreophilic.

In the case of micron, sub-micron or nano-grain sized diamond the surface functional groups that terminate the surface may be caused to be mainly made up of C—OH, C—O—C, C=O and O=C—O⁻ by methods such as heating in concentrated oxidative acids, such as mixtures of nitric and/or sulphuric acid. Alternatively, gaseous heat treatment in 20% hydrogen/argon at 900° C. to terminate the surface in H, followed by 20% oxygen/argon at about 480° C. creates a surface dominated by the oxygen species. Other methods of producing oxygen based functional groups attached to the diamond surface may also be employed. The oxidized diamond surface renders it vitreophilic, that is capable of forming chemical bonds with oxides including, in particular, hydrated oxide structures.

It is expected that in the case of cBN particles a heat treatment in air above 600° C. would increase the concentration of boron oxygen and nitrogen oxygen species on the surface and this may be indicated by Fourier Transform Infra Red Reflectance Spectroscopy. Such a surface exhibited vitreophilic behaviour on subsequent colloidal coating with sol-gel derived oxides. Many of the other well known ultrahard materials such as silicon carbide and silicon nitride and the like have oxidative chemical termination of their surfaces which renders them normally vitreophilic and suitable for the method of this invention.

2. Colloidal Coating of the Abrasive Particles.

Referring to part 2(a) of the schematic diagram, general sol-gel techniques to produce precursor hydrated oxide materials to the desired coating materials are used. One example of such an approach includes the hydrolysis of aluminium sulphate solutions at elevated temperatures such as 100° C., in the presence of organic compounds such as urea, to coat particles in suspension. Hydrous aluminium oxide coats may be produced in this way.

A preferred more general approach, however, is to use the hydrolysis and polycondensation reactions of metal alkoxides in alcohol solutions. Metal alkoxides or alcoholates have a general formula represented by $M^{n+}[OR]_n$, where M is a metal of valence n, O is oxygen and R is an alkyl group. The metal is bonded to the alkyl groups via the oxygen atoms. Most metal alkoxides are soluble in alcohols and can readily be hydrolyzed with water in solution in the alcohol to form hydroxides:

$$M[OR]_n + nH_2O \rightarrow M[OH]_n + nROH \quad (1)$$

Polycondensation reactions as in equation (2) below can then proceed and M-O-M bonds are formed.

$$_{n-1}[HO]M\text{-}OH + HO\text{-}M[OH]_{n-1} \rightarrow {}_{n-1}[HO]M\text{-}O\text{-}M[OH]_{n-1} + H_2O \quad (2)$$

Progressive continuation of this reaction results in a three dimensional -M-O-M-O-M-network. The oxide precursor material so formed is usually amorphous or nano-grain sized with very high surface area and is micro-pourous with $H_2O$ and alcohol in the pores. The surfaces of the pore structure are terminated in hydroxyl, OH functional groups and some unreacted OR functional groups. By appropriate choice of concentrations, alkoxide/water ratios, temperature, solvent alcohol and the presence of other chemical agents such as acids or bases the porous oxide precursor material can be caused to nucleate and grow as a coat on vitreophilic suspended particles in the alcohol solvent. An appropriate concentration of suspended particles to act as growing centers for the coat material must be chosen.

A solution of metal alkoxide(s) is made up in anhydrous alcohol and then slowly added over a time period of about a few hours, to a continuously stirred suspension of the ultra-hard particles in an aliquot of pure water in usually the same alcohol. A peptizing agent such as an acid or base may be added to stabilize the suspension.

Alternatively where a particularly reactive alkoxide reagent is to be employed, better control over the coating formation can be created by slowly adding an aliquot of water in alcohol to a suspension of the ultrahard particles in a suspension of the alkoxide in anhydrous alcohol.

The water and alcohol byproducts of the reactions may be removed by drying and low temperature heat treatment 2(b). Similarly, the OH surface functional groups can be removed. Typically, after filtering, centrifuging or settling and decanting, the suspensions and washing in new clean alcohol and/or de-ionized water, the coated particles can slowly be dried at about 60° C. under a low vacuum for about two days. Further removal of residual water and alcohol can then by achieved by heating slowly to about 300° C. in air.

Many elements of the periodic table are capable of forming alkoxides. The alkoxides found to be useful for creating oxide coats using the method of this invention include those of titanium, aluminium, zirconium, chromium, silicon, tungsten, molybdenum, tantalum, niobium, vanadium with the alkoxides of calcium, magnesium, hafnium, yttrium sometimes used as additives including combinations of these alkoxides. The alkoxides found to be useful for creating nitride coats using the method of this invention include those of aluminium, titanium, zirconium, silicon, tantalum, chromium, niobium, hafnium, vanadium, molybdenum and tungsten, and combinations of these. The alkoxides found to be useful for creating carbide coats using the method of this invention include those of titanium, zirconium, silicon, tantalum, chromium, niobium, hafnium, vanadium, molybdenum and tungsten and combinations of these.

The alkyl groups R in the generalized formula for metal alkoxides, $M[OR]_n$, may include methyl, ethyl, n-propyl, n-butyl and any of the general formula $—C_xH_{2x+1}$. In addition the alkyl groups where side chain alkyl groups are present, such as in the iso-propyl group, $—CH(CH_3)_2$, sec-butyl group, $—CH_3(—CH)CH_2CH_3$, tert-butyl group, $—C(CH_3)_3$ and others are included.

The rate of the hydrolysis reaction and the time to the gelling point for each metal alkoxide are greatly dependent upon the chain length of the alkyl groups. The smaller the chain length of R, the faster the hydrolysis and also the shorter the time to the gelling of the oxide precursor material in the coating of the ultrahard particles. The coating characteristics for each type of desired hydrated oxide precursor coat is strongly influenced by the choice of R.

The alcohols used as the solvent for the alkoxide and water, and as the suspension fluid for the ultrahard particles, may be chosen from any of the normally commercially available liquid solvents. The preferred alcohols are ethanol, methanol and iso-propyl alcohol. More preferably, but not essentially, the alcohol of the same alkyl group as the alkoxide can be used.

Table 1 provides an exemplary, but not a complete, list of some of the most useful alkoxides in the method of the invention.

TABLE 1

| Metal (M) | Alkoxide name | Formula $M[OR]_n$ |
|---|---|---|
| Titanium | Titanium methoxide | $Ti[OCH_3]_4$ |
| | Titanium tetraethoxide | $Ti[OC_2H_5]_4$ |
| | Titanium n-propoxide | $Ti[C_3H_7]_4$ |

TABLE 1-continued

| Metal (M) | Alkoxide name | Formula M[OR]$_n$ |
|---|---|---|
| | Titanium iso-propoxide | Ti[OCH(CH$_3$)$_2$]$_4$ |
| | Titanium n-butoxide | Ti[OC$_4$H$_9$]$_4$ |
| Aluminium | Aluminium methoxide | Al[OCH$_3$]$_3$ |
| | Aluminium tri-ethylate | Al[OC$_2$H$_5$]$_3$ |
| | Aluminium n-propoxide | Al[OC$_3$H$_7$]$_3$ |
| | Aluminium iso-propoxide | Al[OCH(CH$_3$)$_2$]$_3$ |
| | Aluminium n-butoxide | Al[OC$_4$H$_9$]$_3$ |
| | Aluminium tri-sec-butylate | Al[OCHCH$_2$CH$_3$CH$_3$]$_3$ |
| Silicon | Silicon methoxide | Si[OCH$_3$]$_4$ |
| | Silicon orthosilicate | Si[OC$_2$H$_5$]$_4$ |
| Zirconium | Zirconium methoxide | Zr[OCH$_3$]$_4$ |
| | Zirconium ethoxide | Zr[OC$_2$H$_5$]$_4$ |
| | Zirconium n-propoxide | Zr[C$_3$H$_7$]$_4$ |
| Vanadium | Vanadium ethoxide | V[OC$_2$H$_5$]$_4$ |
| | Vanadyl Oxy-ethoxide | VO[OC$_2$H$_5$]$_4$ |
| | Vanadyl Oxy-iso-propoxide | VO[OCH(CH$_3$)$_2$]$_4$ |
| Niobium | Niobium ethoxide | Nb[OC$_2$H$_5$]$_5$ |
| Tantalum | Tantalum ethoxide | Ta[OC$_2$H$_5$]$_5$ |
| Chromium | Chromium ethoxide | Cr[OC$_2$H$_5$]$_3$ |
| Tungsten | Tungsten ethoxide | W[OC$_2$H$_5$]$_5$ |
| Hafnium | Hafnium ethoxide | Hf[OC$_2$H$_5$]$_4$ |

After drying/preliminary heat treatment, the coated particles may be examined using a scanning electron microscope and/or transmission electron microscope.

3. Temperature Programmed Heat Treatment (TPRe)

The coated particles now undergo temperature programmed heat treatment or reaction. This is done in chosen gaseous environments, at chosen heating rates, to chosen top temperatures, for chosen times in order to control removal of residual volatile impurities, to densify and sinter, to change to other structural phases and to chemically react the coat with the gases leading to other material types and phases. A preferred approach is to use a flowing gas system with a carefully chosen and controlled flow rate. The heating of the coated particulate material may be done in a tube furnace, rotating tube furnace, organized to slowly "stir" the particles and so prevent fritting or agglomeration, or any appropriate furnace arrangement for the controlled heating of particulate materials in chosen controlled gaseous environments.

Figure 1:
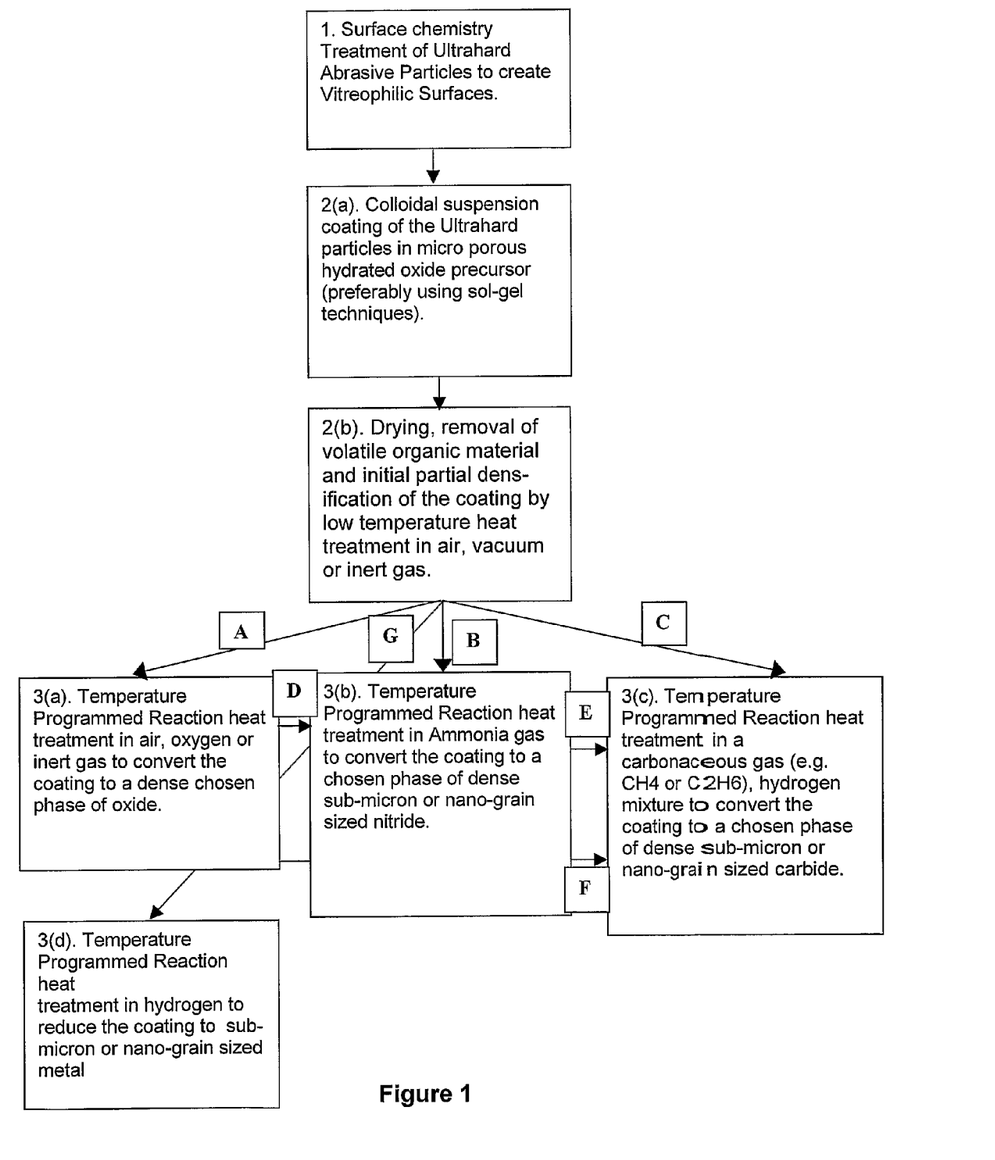
FIG. 1 is a schematic diagram of the process steps of the invention.

With reference to the schematic diagram, FIG. 1, after the preliminary drying/heat treatment, 2(b), there are several routes to convert the coat material to desired materials. (The preliminary drying/heat treatment 2(b) may itself involve a multi-step process, for example, drying in vacuum at less than 100° C. to remove mostly free water from the micro-pores of the coating, followed by heating, for example up to about 300° C. in vacuum or air to remove residual alcohols and chemically adsorbed hydroxyl and functional groups from the surfaces.

One route, Route A, is the calcining of the coated particles in air or oxygen or inert gas to convert the coat into a chosen oxide. Depending upon the particular porous oxide precursor material being dealt with, sintering and or crystallization will occur involving densification. Phase changes to different crystal structured oxide may also occur and can be organized to form desired oxides. Usually nano-grain sized oxide(s) are formed by this method. Alternatively, some oxide coats do not crystallize but densify by vitreous sintering to form glasses. In each case, the required heat treatment conditions are determined by using reaction monitoring and characterization techniques such as Thermogravimetric Analysis (TGA), Differential Thermal Analysis (DTA), X-ray Diffraction (XRD) and the like. The heating can be carried out in any convenient equipment capable of accommodating fine particulate material, although rotating furnaces and fluidized bed furnaces are preferred.

Route B provides for the heating of the dried coated particles from 2(b) in ammonia or ammonia inert gas mixtures to convert the porous oxide precursor coat to a nitride(s) or oxynitride(s). The ammonia decomposes into very active nitrogen and hydrogen species which progressively reduce and nitride the precursor oxide coat. By choice of conditions various oxynitride and nitride structures can be formed. Again the required heat treatment conditions are determined by using reaction monitoring and characterization techniques such as Thermogravimetric Analysis (TGA), Differential Thermal Analysis (DTA), X-ray Diffraction (XRD) and the like. Usually nano-grain sized coatings result.

Route C provides for the heating of the dried coated particles from 2(b) in carbonaceous hydrogen gas mixtures to convert the porous oxide precursor coat to a carbide(s) or oxycarbide(s). The carbonaceous gases may in principle be any hydrocarbon gas but preferably methane or ethane. The carbonaceous/hydrogen gas mixtures may be diluted in inert carrier gases such as argon, for example. If the active gases make up no more than 20% of the inert carrier gas then it is unlikely that an explosive gas mixture with air can form if a leak occurs and so safety is enhanced. Typical methane or ethane/hydrogen ratios are from 1/4 to 1/20. The required heat treatment conditions are determined by using reaction monitoring and characterization techniques such as Thermogravimetric Analysis (TGA), Differential Thermal Analysis (DTA), X-ray Diffraction (XRD) and the like.

An alternative to convert the coatings to oxynitrides and nitrides is to employ Route A to a chosen oxide and then to pursue Route D by applying ammonia environment heat treatments to obtain the nitrides. Further by then employing Route E by applying carbonaceous/hydrogen gas treatments to the so formed nitride coats other carbide microstructures can be generated as compared to Route C.

Further still after Route A to the oxide structures, Route F can be employed to generate carbide microstructures directly from the oxide phases.

In the case where the porous oxide coat from 2(b) is readily reducible with hydrogen, Route G can be employed and fine grained metallic coats can be obtained.

The alternative Route combinations allow design and variation of the carbon, nitrogen and oxygen composition of each carbide, nitride and oxide. For example by choice of route and TPRe conditions oxynitride materials, MNO$_x$ materials, M being a metallic element, with chosen x between 0.5 and 0.05 can be made. A further example is that by choice of Route and TPRe conditions carbonitride materials, MCN$_Y$ materials, where y may be between 0 and 1 can be generated.

The heating temperatures necessary to produce crystalline species of the designed compositions and structures for the coat materials are relatively low. This can result in the formation of low-temperature crystalline species not obtained by more conventional solid state reactions normally conducted at higher temperatures. Most of the temperatures required are below 1200° C., are often below 1000° C. and even as low as 550° C. in some cases.

The invention will now be described in more detail with reference to the following non-limiting examples.

EXAMPLE 1

50 g of sub-micron cubic boron nitride, of average particle size 0.7 micron, in the general size range of from 0.5 to 1.0 micron was treated in fuming concentrated sulphuric acid to which was added potassium nitrate. After washing and drying the sub-micron cBN was further heated in air at 600° C. for 30 minutes. These procedures ensured that the cBN surface chemistry was dominated by oxygen related functional groups and was thus rendered vitreophilic.

15 g of this sub-micron surface treated cBN was then suspended in 865 ml of pure ethanol in a beaker to which had been added 7.3 ml of de-ionized water. The suspension was vigorously stirred with a paddle stirrer at about 100 rpm. 15.3 g of titanium iso-propoxide liquid, $Ti(OC_3H_7)_4$, was dissolved in 100 ml of anhydrous ethanol. This solution was then slowly added to the cBN/ethanol/water suspension in a drop-wise manner over a period of 1 hr, at room temperature (about 25° C.), while continuing to stir. Stirring was continued for a further 2 hrs and the beaker contents left to age overnight. The resulting coated particles were removed from the suspension by vacuum filtering, washed three times in ethanol and three times in de-ionized water and then dried at 60° C. for 2 days in a vacuum oven. On examination under a scanning electron microscope (SEM), it was observed that each cBN particle had been completely coated in a titanium oxide compound, expected to be micro-porous, amorphous titania, $TiO_2$.

Figure 2:
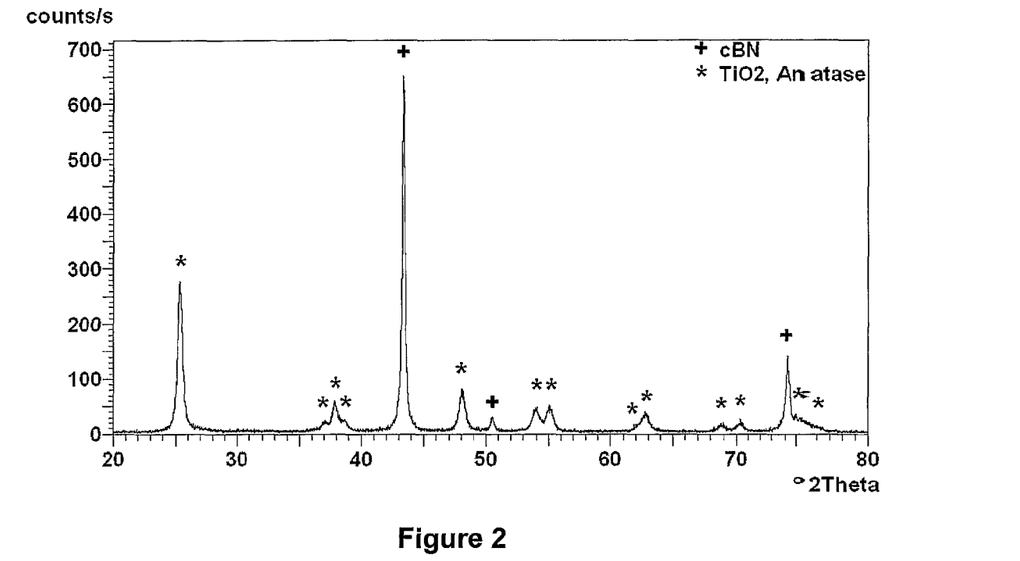
FIG. 2 is an X-ray diffractogram of titania coated cBN particles, an intermediate material in a preferred embodiment of the process of the invention.

10 g of $TiO_2$ coated cBN particles was then heat treated in flowing air at 700° C. for 3 hrs. The heating rate and cooling rates were kept at 5° C. per minute. On examination with an X-ray diffraction spectrometer it was found that the coating had been crystallized to the anatase phase of titania, as shown in FIG. 2. On examination of a sample of this particulate material in a transmission electron microscope, TEM, it was found that indeed, the titania coat had crystallized in the form of nano-sized crystallites of about 30 nm in dimensions.

Figure 3:
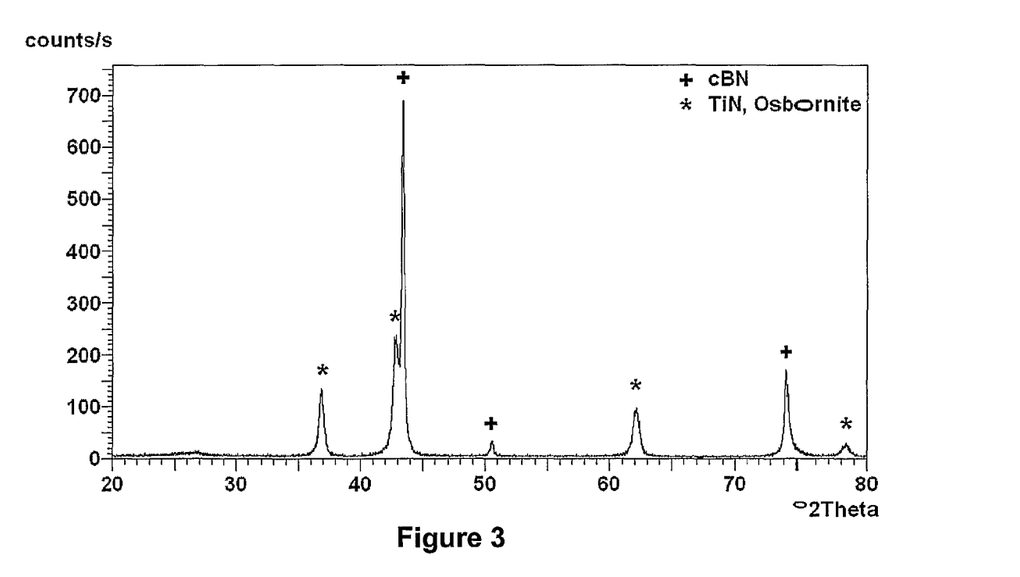
FIG. 3 is an X-ray diffractogram of titanium nitride coated cBN particles, the result of heat treating the titania coated cBN particles referred to with reference to FIG. 2.

5 g of the air heat treated titania coated sub-micron cBN particles was then further heated at 1100° C. for 5 hrs in a tube furnace while being exposed to a flow of dry ammonia gas, $NH_3$. The heating rate used was 10° C. per minute. This heat treatment in ammonia converted the nano-grain sized titania coat into nano-grain sized titanium nitride. TEM examination of this material showed that the coat was now made up of titanium nitride crystallites of about 40 nm in dimensions. FIG. 3 is an X-ray diffractogram showing that the resultant coat was indeed titanium nitride, TiN, referred to as osbornite.

EXAMPLE 2

30 g of cBN powder of average particle size 2 microns was suspended in a 1 to 1 mixed solution of 15% hydrogen peroxide, $H_2O_2$, and 15% ammonium hydroxide, $NH_4OH$, in water. This served to hydrolyze the surfaces of the cBN particles and thus render them vitreophilic. The 2 micron cBN powder was then removed from suspension by filtering and washed in de-ionized water.

25.5 g of the cBN powder so prepared was then suspended in 1440 ml of ethanol to which had been added 13.1 ml of de-ionized water. The suspension was ultrasonically probed for 15 min in order to break up any agglomerates of cBN particles. 20.7 g of titanium iso-propoxide was dissolved in 100 ml of anhydrous ethanol. This solution was then added to the vigorously stirred suspension of cBN in the ethanol/water in a drop-wise fashion over a period of 1 hr at room temperature. After addition the suspension was stirred for a further 2 hrs and then left to age overnight. The particulate material was then removed from suspension by filtering and washed in pure ethanol three times followed by three washings with de-ionized water and then dried at 60° C. for two days in a vacuum oven. Examination of the particulate material in a scanning electron microscope, using the EDS facility, showed that the cBN particles were coated in a compound of titanium and oxygen. Each particle was completely coated to the same degree.

20 g of this coated cBN was then calcined in a tube furnace in flowing dry air at 450° C. for 3 hrs. The heating and cooling rates were kept at 5° C. per min. On examination with an X-ray diffractometer it was shown that the coating had crystallized and was titania, $TiO_2$, of the anatase structure.

8 g of the calcined anatase titania coated cBN was then heated in a tube furnace at 1100° C. for 5 hrs in a stream of dry ammonia gas. On examination with an X-ray spectrometer it was shown that the anatase titania coat had been converted to titanium nitride.

In this way samples of 2 micron average sized cBN particles had been coated in amorphous titania of the anatase structure and titanium nitride respectively.

EXAMPLE 3

105 g of 120/140 US mesh, (105 to 125 μm), facetted, crystalline cBN was treated in boiling, 32 vol-% hydrochloric acid, washed in water and dried. This material was then heated in air at 650° C. for 1 hr to slightly oxidize the surfaces of the particles.

The cBN particles were then suspended in 500 ml of pure ethanol to which had been added 10.6 ml of de-ionized water. The suspension was created and maintained by mechanically stirring with a paddle stirrer at about 100 rpm. 20 g of titanium iso-propoxide of formula $Ti(OCH(CH_3)_2)_4$ was dissolved in 100 ml of pure anhydrous ethyl alcohol and this solution slowly added to the stirred suspension, in a drop wise fashion, over a period of 2 hrs. The suspension was then stirred for a further 2 hrs to allow the hydrolysis and polycondensation reactions to approach completion. The cBN particulate material was then washed in ethyl alcohol three times by settling and decanting. After a final decantation the material was allowed to dry slowly for two days at ambient conditions, followed by 24 hrs in a vacuum oven at 60° C.

Figure 4:
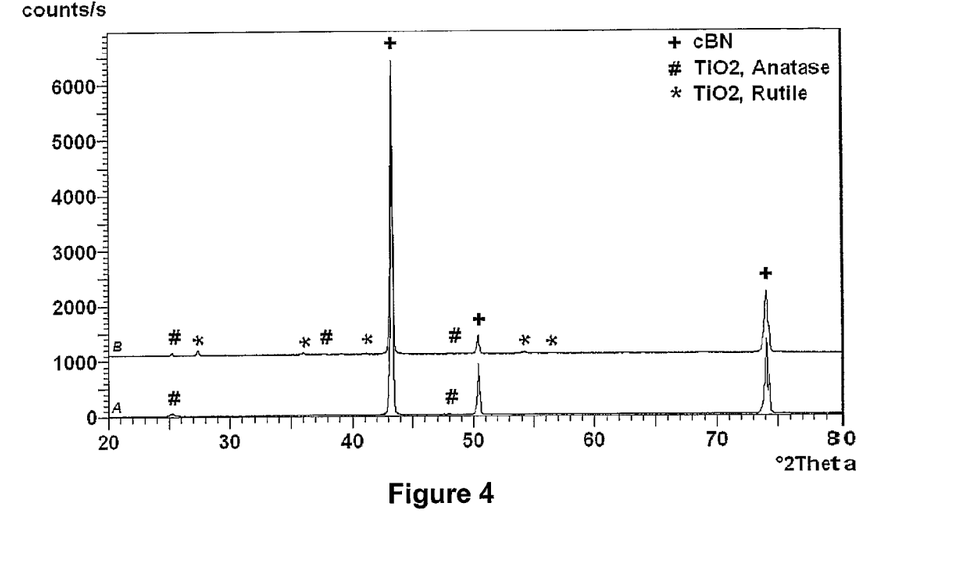
FIG. 4 is an X-ray diffractogram of titania coated cBN particles, produced in accordance with another preferred embodiment of the process of the invention, after heat treatment at 475° C. (A), and after heat treatment at 800° C. (B)

The coated cBN was then divided into two samples, one sample was slowly heated in air to 475° C. and maintained at that temperature for 3 hrs, and the second sample similarly heated to a temperature of 800° C. for 3 hrs. FIG. 4 is an X-ray diffractog ram showing that (A), the 475° C. heated material was cBN coated in very finely crystalline titania, $TiO_2$, of the anatase structure, and that (B), the 800° C. heated material was cBN coated in finely crystalline titania, $TiO_2$ of predominantly the rutile structure, with a small component of anatase remaining.

The first sample was then heated in dry ammonia at 1100° C. for 5 hrs and the titania coat was then converted into titanium nitride. The coat was imaged with a SEM and seen to well cover all the surfaces of the cBN crystals but with a small occurrence of cracks in the coat.

EXAMPLE 4

50 g of diamond micron derived from a synthetic diamond source by crushing and size classification procedures, of average particle size 1.0 micron, in the general size range of from 0.75 to 1.5 micron was treated in fuming concentrated sulphuric acid to which was added potassium nitrate. This cleaning ensured that the diamond was free from metallic and inorganic surface contaminants. The diamond was then heated in a flowing 20% oxygen in argon gas stream at 480° C. for 1 hr. This procedure maximized the oxygen containing functional groups attached to the diamond surfaces and rendered the surfaces to be vitreophilic.

15 g of this 1 micron surface treated diamond was then suspended in 865 ml of pure ethanol in a beaker to which had been added 7.3 ml of de-ionized water. The suspension was vigorously stirred with a paddle stirrer at about 100 rpm. 15.6 g of titanium iso-propoxide liquid, $Ti(OC_3H_7)_4$, was dissolved in 100 ml of anhydrous ethanol. This solution was then slowly added to the diamond/ethanol/water suspension in a drop-wise manner over a period of 1 hr, at room temperature (about 25° C.), while continuing to stir. Stirring was continued for a further 2 hrs and the beaker contents left to age overnight. The resulting coated particles were removed from the suspension by vacuum filtering, washed three times in ethanol and three times in de-ionized water and then dried at 60° C. for 2 days in a vacuum oven.

12 g of the dried coated diamond was then heated in static air at 450° C. for 2 hrs. A heating rate of 5° C. per minute was used. The material was then examined using SEM and X-ray diffraction and it was found that the diamond was now coated in crystalline, anatase phase titania and that no other phases or compounds were detected.

Figure 5:
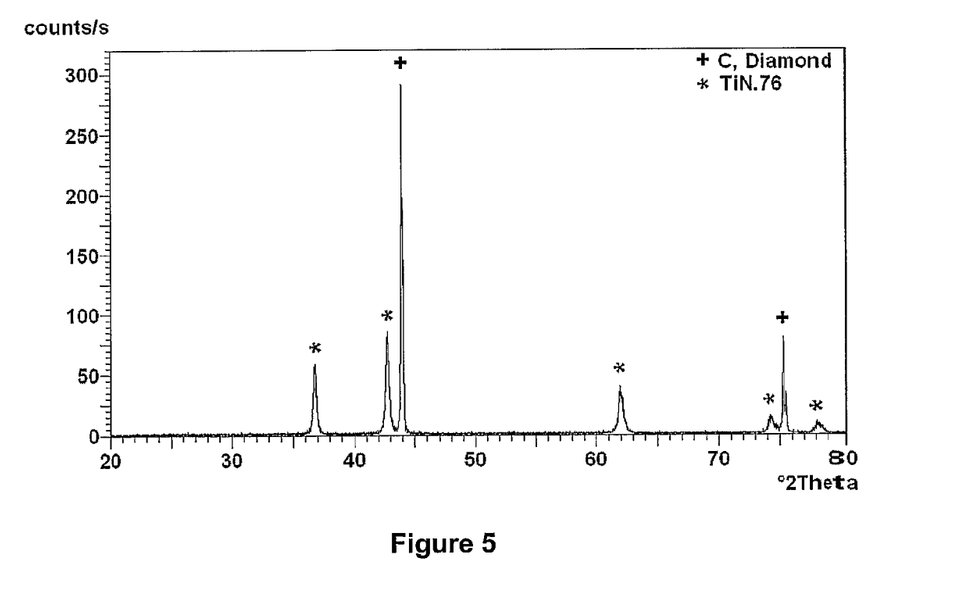
FIG. 5 is an X-ray diffractogram of titanium nitride coated diamond particles produced in accordance with yet another preferred embodiment of the process of the invention.

5 g of this coated material was then heat treated in flowing dry ammonia for 5 hrs at 1100° C. An ammonia flow rate of about 1 liter per minute and a heating rate of about 10° C. per minute were used. SEM and XRD analysis showed that the diamond was now coated in titanium nitride. FIG. 5 is an X-ray diffractogram showing the presence of diamond and titanium nitride and that no other phases and components were detected. Thus the 1 μm diamond had been completely coated in titanium nitride.

EXAMPLE 5

The procedure as detailed in Example 4 above may be carried out up to and until a crystalline anatase coated diamond powder has been produced on the synthetic diamond of about 1 μm average size. It is expected that if this powder is exposed to a flowing 10% methane in argon and 10% hydrogen in argon gas mixture, with an appropriate ratio of methane to hydrogen (expected to be 1 to 4), at a temperature of about 1350° C. for several hours (probably more than 5 hours), that the titania coat would be converted to titanium carbide. Titanium carbide coated 1 μm diamond would thus be produced.

EXAMPLE 6

A 20 g sample of facetted synthetic diamond of average particle size of 105 to 125 μm was suspended in 1.25 liters of ethyl alcohol of purity greater than 99%. The diamond sample had previously been heated at 480° C. for 10 min in a flowing stream of 20% oxygen in argon, in order to produce surfaces with predominantly oxygen containing functional groups. To this vigorously stirred suspension 250 ml of de-ionized water and 30 ml of 25% by volume aqueous ammonium hydroxide solution were added.

40 g of tetraethoxysilane $(Si(OC_2H_5)_4)$ was dissolved in 100 ml of the 99% pure ethyl alcohol. This solution was slowly added at a constant rate to the stirred suspension maintained at room temperature over a period of 8 hrs. Stirring was continued for a further 1 hr. Stirring was stopped and the coated diamond particles were allowed to settle. The supernatant liquid above the settled plurality of diamond particles was predominantly clear and was decanted. The coated particles were then washed three times with the pure ethyl alcohol. After filtering the plurality of diamond particles was dried in a vacuum oven at 60° C. for 24 hrs.

A sample of the coated particles was then examined in an scanning electron microscope (SEM), which showed that the particles were completely covered with a coat, shown to be composed of silicon and oxygen using energy dispersive analysis (EDS). The thickness was estimated to be about 0.4 μm.

Half of the sample was then heated in a stream of pure argon in a tube furnace to a temperature of 670° C. (sample A) and maintained at that temperature for 3 hrs. The heating rate was 3° C. per min. On further examination in the SEM it was observed that a degree of coalescence of the coat had taken place and that some shrinkage of the coat had occurred.

The other half of the sample was heated in a stream of pure argon to a temperature of 900° C. (sample B) for 3 hrs, again at a heating rate of 3° C. per min. On examination in the SEM it was observed that the coat had a glass appearance and fully covered all parts of the facetted diamond surfaces. The estimated thickness was about 0.2 to 0.3 μm and was largely a fully dense silica glass. Under the optical microscope the coat was transparent. No cracks were observed in the coats, which indicated that the thermal expansion mismatch between the diamond particulate substrate and the silica coat was low.

The 670° C. heat treated sample, (sample A) and 900° C. heat treated sample (sample B), were then tested in comparison to an uncoated sample of the same diamond on a thermogravimetric analyzer in a stream of air at a heating rate of 20° C. per min. The onset of oxidation of the uncoated diamond was measured to be 781° C. and for sample A and B, 791° C. and 893° C. respectively. This indicated that sample A still had significant open porosity, giving a minor inhibition of oxidation whereas sample B with an onset temperature delay of about 110° C. exhibited substantial oxidation protection of the diamond. This result indicates that the 900° C. heat treated material, sample B was completely covered in a predominantly fully dense $SiO_2$ glass coat as suggested by the SEM and optical images.

EXAMPLE 7

A plurality 0.75 to 1.5 micron sized diamond particles which had been produced by well known crushing and size classification processes was treated in fuming concentrated sulphuric acid to which was added potassium nitrate. This procedure ensured that the diamond surface chemistry was dominated by oxygen related functional groups, was thus vitreophillic, which allows the surface chemical species to take part in the sol-gel reactions. 20 g of this diamond was dispersed with the aid of an ultrasonic probe in 2.5 liters of 99% pure ethyl alcohol, to which had been added 500 ml of de-ionized water and 60 ml of 25 vol-% aqueous ammonium hydroxide solution. The suspension was vigorously stirred using a mechanical paddle and maintained at room temperature (25° C.). A solution of 80 g of silicon tetraethoxysilicate $(Si(OC_2H_5)_4)$ was dissolved in 100 ml of 99% pure ethanol. This solution was slowly added to the suspension over a period of 12 hrs. The stirring was then continued for another hour. The plurality of coated diamond particles was then removed from suspension, washed and dried as described in Example 6.

SEM examination showed that each approximately 1 μm sized diamond particle was completely coated. By weighing before and after coating, the coat was estimated to be about 30% weight of the total mass.

The coated material was divided into three approximately equal amounts and labeled sample C, D and E. Sample D was heated in a stream of pure argon to a temperature of 670° C. for 3 hrs, the heating rate was 3° C. per minute. Similarly, sample E was heat treated at a top temperature of 1000° C., again for 3 hrs. Sample C was retained in the dried state and was not further heat treated. On SEM examination, the particles of sample E were completely covered in a crack free coat with the appearance of a fused glass.

The specific surface area of an uncoated sample of the diamond and samples C, D and E were measured using the well established Brunauer, Emmet and Teller (BET) nitrogen adsorption method. The results are presented in Table 2.

TABLE 2

| Diamond | Specific Surface Area ($m^2g^{-1}$) |
| --- | --- |
| Uncoated 0.75 to 1.5 µm | 7.86 |
| Sample C | 140.00 |
| Sample D | 8.07 |
| Sample E | 7.13 |

It is noted from Table 2, that the silica coat of Sample C provided a twenty-fold increase of specific surface area as compared to the specific surface area of the uncoated diamond powder. This demonstrated that the coat indeed had a highly micro-porous open structure.

After heat treatment in argon at 670° C., (sample D), sufficient viscous flow of the silica of the coat had occurred such that the open porosity had substantially been removed as indicated by the specific surface area now being lowered back to that similar to the uncoated powder. The specific surface area of sample E, after heat treatment at 1000° C., had been lowered to slightly below that of the uncoated powder. This indicated slightly more closing of the open porosity and possibly a slight smoothing of the powder surface, consistent with the formation of a fully dense, silica glass coat covering the edges and asperities of the diamond particles. These results indicate that the porosity and density of the silica coats can be manipulated by choice of heat treatment procedure subsequent to sol-gel coating.

EXAMPLE 8

20 g of well facetted, highly crystalline, 105 to 125 micron diameter cBN grit particles was treated in boiling, 32 vol-% hydrochloric acid, washed in water and dried. This material was suspended by vigorous stirring in a mixture of 1.8 liters 99% pure ethanol, 350 ml of de-ionized water and 40 ml vol-% aqueous ammonium hydroxide solution. A 30% by weight solution of tetraethoxysilane ($Si(OC_2H_5)_4$) in dry pure ethanol was then slowly and consistently added to the stirred suspension over a period of 10 hrs. Stirring was continued for a further hour. The material was allowed to settle, the supernatant liquid removed and the coated cBN particles washed in pure dry ethanol. The coated material was then dried at 60° C. in a vacuum oven for 24 hrs. This coated material was then heated in dry, pure argon at 3° C. per min, up to a temperature of 800° C. and maintained at this temperature for 3 hrs. On subsequent SEM examination, it was found that the grit particles were completely covered in a crack free silica coat of predominantly smooth featureless appearance.

EXAMPLE 9

The coating procedure detailed in Example 7 for 0.75 to 1.5 micron diamond was applied to coat cBN micron powder of average size 1.25 micron. The sol-gel coated fine powder after drying for 24 hrs in vacuum at 60° C. was heat treated in argon at 800° C. for 3 hrs. On SEM examination, it was shown that complete coverage with a dense silica coat had been achieved for each individual cBN particle.

EXAMPLE 10

110 g of 120/140 US mesh, (105 to 125 µm) facetted, crystalline cBN was treated in boiling, 32 vol-% hydrochloric acid, washed in water and dried. This material was then heated in air at 650° C. for 1 hr to slightly oxidize the surfaces of the particles.

These cBN particles were then suspended in 250 ml of a solution of zirconium n-propoxide of formula $Zr(OC_3H_7)_4$, in anhydrous iso-propanol. The suspension was maintained by vigorous mechanical stirring with a paddle stirrer at about 100 rpm. The mass of zirconium n-propoxide in solution was 15 g.

Figure 6:
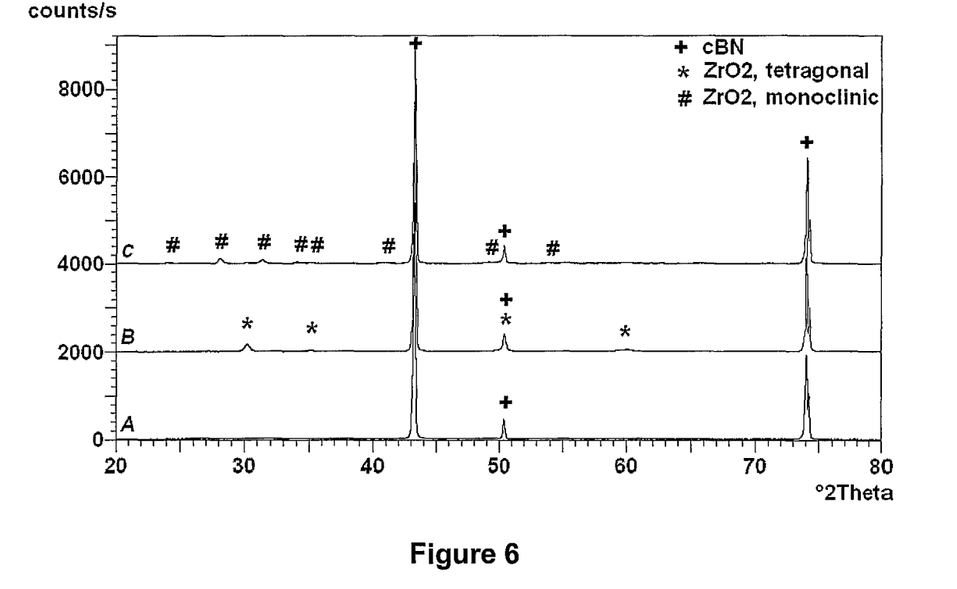
FIG. 6 is an X-ray diffractogram of zirconia coated cBN particles, produced in accordance with still another preferred embodiment of the process of the invention, after drying (A), after heat treatment at 475° C. (B), and after heat treatment at 800° C. (C).

3.8 ml of de-ionized pure water was mixed with 100 ml of iso-propanol and this mixture slowly added to the suspension of cBN particles over a period of 90 min. The stirring was then continued for a further 3 hrs to allow the hydrolysis and polycondensation reactions to approach completion and the cBN particles to be coated. The coated cBN particles were then allowed to settle overnight, and the supernatant liquid decanted. The coated cBN particles were then washed three times in iso-propanol by sequential settling and decantation. The coated cBN was then left to dry overnight by slow evaporation of the residual alcohol under ambient conditions. The material was then further dried by heating in a vacuum oven at 60° C. for 24 hrs. On examination with a scanning electron microscope it was observed that each cBN particle was completely coated with a substantially crack free coat. The coat extended over edges, corners, steps and re-entrant edges. On examination of the dried coated cBN in an X-ray diffractometer, only sharp diffraction lines corresponding to crystalline cBN were observed, as seen in FIG. 6(A). This indicated that the expected zirconia coat was substantially amorphous.

50 g of the coated and dried cBN particles was then heated in air at 475° C. for 3 hrs. A very slow heating rate was employed of about 20° C. per hour. An X-ray diffractogram of this material, FIG. 6(B), showed that the zirconia coat had crystallized to form microcrystalline zirconia, $ZrO_2$, of the tetragonal crystallographic structure.

Another 50 g sample of the coated and dried cBN was heated in air to 800° C. for 3 hrs, again with a similar very slow heating rate. On X-ray diffraction examination, the coat was shown to have crystallized in the monoclinic phase of zirconia, $ZrO_2$, FIG. 6(C).

It is expected that cBN with such crystalline zirconia coats will be less reactive to vitreous bonds during the manufacture of such grinding wheels and the like.

This exemplifies the alternative coating approach whereby a water, alcohol solution is slowly added to the particles to be coated in suspension in alkoxide, alcohol solution.

EXAMPLE 11

Sub-micron cubic boron nitride with a general particle size range of 0.5 to 1 micron (average particle size of 0.7 micron) was acid treated as described in Example 1. 34.0 g of the acid treated cBN powder was suspended in 2020 ml of pure ethanol and 42 ml of de-ionized water. This cBN suspension was treated with an ultrasonic probe for 20 minutes to break up particle agglomerates, followed by vigorous mechanical stirring with a paddle-type stirrer.

19.8 g of zirconium (IV) n-propoxide (70% w/w in n-propanol), with the chemical formula, $Zr[O(CH_2)_2CH_3]_4$, was dissolved in 120 ml of dry ethanol. The alkoxide solution was added to the stirred cBN suspension, at room temperature, drop-wise over 3 hrs and left to stir for an additional 1.5 hrs after addition of the alkoxide. The coated cBN suspension was left to age at room temperature overnight. The zirconium oxide coated cBN was washed three times with pure ethanol and rotavapor dried under a vacuum between 600 and 390 mbar and a temperature between 70 and 80° C. The resultant powder was additionally dried in a vacuum oven at 60° C. for 2 days. The dried powder was investigated under the scanning electron microscope and it was found that the cBN particles were well coated.

This dried powder was subsequently heat treated in static air at 600° C. for 3 hours. The heating rate that was used was 5° C. per minute. X-ray diffraction analysis of the heat treated powder showed that the coat was tetragonal zirconium oxide, $ZrO_2$.

TEM micrographs showed that the coat on the sub-micron cBN particle surfaces comprised nano sized particles of approximately 5 nm diameter.

EXAMPLE 12

Sub-micron cubic boron nitride with a particle size range of 0.5 to 1 micron (average particle size of 0.7 micron) was acid treated as described in Example 1. 25 g of this powder was suspended in 1.5 liters of pure ethanol and 30 ml of de-ionized water and ultrasonically probed for 25 minutes. In a separate beaker 0.48 g of yttrium nitrate hexahydrate, $Y(NO_3)_3 \cdot 6H_2O$, was dissolved in 50 ml of pure ethanol, followed by the addition of 13.9 g of zirconium (IV) n-propoxide, chemical formula, $Zr[O(CH_2)_2CH_3]_4$ and an additional 50 ml of pure ethanol. The contents of the latter beaker was stirred with a glass rod and additionally mixed by shaking the contents in a separating funnel. The yttrium nitrate hexahydrate-zirconium (IV) n-propoxide solution mixture was added to the stirred cBN suspension in a drop wise fashion at room temperature over a period of 2 hrs. After this addition the solution was mechanically stirred for a further 1 hour and 10 minutes. The solution was then left to age overnight at room temperature. The resulting plurality of coated particles was found to have formed a highly viscous gel after overnight ageing. After a total ageing time of 48 hrs the sol-gel was rotavapor dried under a vacuum of 400 mbar and a temperature between 70 and 80° C.

This powder was additionally dried in a vacuum oven at 60° C. for 2 days. The dried zirconium oxide coated cBN powder was then heat treated in static air at 600° C. for 3 hours. A heating rate of 5° C. per minute was used. X-ray diffraction analysis showed that the resultant powder consisted of cBN coated with tetragonal zirconia with stoichiometry $ZrO_{1.99}$. TEM micrographs showed zirconia grains of 4 to 5 nm in size.

EXAMPLE 13

12 g of 120/140 US mesh, (105 to 125 micron), facetted, crystalline cBN was heated in air at 650° C. to oxidize the surfaces. This material was then stirred and suspended in 200 ml of pure iso-propanol, to which had been added 22 ml of de-ionized water. The suspension was warmed and maintained at 50° C. under reflux.

To this suspension a solution of 10 g of aluminium sec-butoxide of formula, $Al(OC_4H_9)_3$, in 50 ml of anhydrous iso-propanol, was slowly added over a period of 1 hr. The suspension was stirred for a further 2 hrs at which point 1 ml of 55% nitric acid was added and the suspension stirred for a further 1 hr. The particulate material was then allowed to settle and washed in iso-propanol, followed by slow drying at ambient conditions overnight. Finally the coated cBN was dried in a vacuum oven for 24 hrs at 60° C. On examination in the SEM it was seen that the cBN particles were substantially covered in a thin coat of aluminium oxide compound.

It is anticipated that this coat can be converted into a series of so called transient alumina structures by heating in air at various temperatures in the range 400° C. to 1200° C., until at about 1150° C. and above, so called $\alpha\text{-}Al_2O_3$ would be generated. These alumina structures are known in the art of heat treatment of sol-gel derived aluminas.

EXAMPLE 14

1 micron synthetic diamond powder with a general particle size range of 0.75 to 1.5 micron was acid cleaned as described in Example 4. 20 g of this diamond powder was suspended in a solution comprising 258 ml of pure iso-propanol and 175 ml of deionized water. This suspension was heated to 60° C. in a refluxing unit and mechanically stirred with a paddle-type stirrer at about 100 rpm. 24 g of aluminium sec-butoxide, with chemical formula $AlO_3C_{12}H_{27}$, was dissolved in 100 ml anhydrous iso-propanol and added to the heated and stirred diamond suspension drop-wise over 1 hour and 45 minutes. The suspension was left stirring for 1 hour and 15 minutes at 60° C. after addition of the alkoxide. About 1 ml of hydrochloric acid (32%) was then added to the heated suspension, which was then heated up to 80° C. and stirred for an additional one hour while maintaining the temperature. The suspension was then allowed to cool to room temperature and aged at room temperature overnight. The suspension was then rotavapor dried at a temperature of 80° C. and vacuum of 400 mbar.

The aluminium-compound coated diamond was additionally dried in a vacuum oven at 60° C. for two days. SEM analysis showed that the diamond particles were coated with aluminium oxide compound.

This powder was then heat treated at 400° C. in static air for 3 hours. A heating rate of 5° C. per minute was used. X-ray diffraction analysis showed that after this heat treatment the coating on the diamond was still predominantly amorphous. This was confirmed by TEM analysis.

EXAMPLE 15

12 g of clean 120/140 US mesh, (105 to 125 micron), well facetted, largely octahedral morphology, synthetic diamond was heated in air at 500° C. for 1 hr to produce oxidized surfaces. This diamond was suspended in 200 ml of pure ethanol to which had been added 20 ml of de-ionized water. The suspension was maintained by stirring.

A solution of 5.1 g tungsten ethoxide of formula, $W(OC_2H_5)_5$, in 50 ml of pure anhydrous ethanol was then slowly added to the stirred suspension, in a drop by drop fashion over a period of about 1 hr. The suspension was stirred for a further 1 hr for the hydrolysis and polycondenstaion reactions to approach completion. After repeated settling, decantation and washing in pure ethanol, the diamond particles were dried by natural evaporation followed by treatment in a vacuum oven at 60° C. SEM and EDS analysis showed that each diamond crystal had been evenly covered with a thin coat of a compound of tungsten and oxygen, expected to be tungstic oxide, $WO_3$. The thickness was estimated to be of about 0.25 μm.

A sample of the coated diamond was then heated in an atmosphere of hydrogen at a temperature of 550° C. for 1 hr. On examination with the SEM it was found that the tungstic oxide coat had been reduced to tungsten metal and had formed a dispersion of very fine particles or islands of this metal of about 100 nm or smaller. It was concluded that the $WO_3$ coat, in this instance, was insufficient in amount to provide a complete coverage of tungsten coat on reduction to the metal.

It is expected that a $WO_3$ coat thickness of about 1 µm or greater would be required to generate a complete tungsten metal coat on this size of diamond particle. This should be possible by appropriate adaptation of the details of this example.

The invention claimed is:

1. A method of coating ultrahard abrasive particles, comprising:
providing a plurality of ultrahard abrasive particles selected from the group consisting of diamond, cubic boron nitride, and a combination thereof, wherein the ultrahard abrasive particles have vitreophilic surfaces which form chemical bonds with oxides;
coating the ultrahard abrasive particles with an oxide precursor material selected from the group consisting of an amorphous or nano-crystalline oxide, a hydroxide, and an oxo-hydroxide; and
heat treating the coated ultrahard abrasive particles to dry and purify the coats.

2. The method according to claim I, wherein the coated ultrahard abrasive particles are treated to convert the oxide precursor material to an oxide, nitride, carbide, oxynitride, oxycarbide, or carbonitride of the oxide precursor material, or an elemental form of the oxide precursor material, or a combination thereof.

3. The method according to claim 2, wherein the converted oxide precursor material is selected from the group consisting of micron, sub-micron, or nano-grain sized oxides, nitrides, carbides, oxynitrides, oxycarbides or carbonitrides of the oxide precursor materials, elemental precursor materials, and a combination thereof.

4. The method according to claim 2, wherein the converted oxide precursor material is selected from the group consisting of oxides, nitrides, carbides, oxynitrides, oxycarbides and carbonitrides of aluminium, titanium, silicon, vanadium, zirconium, niobium, hafnium, tantalum, chromium, molybdenum, and tungsten, the elemental forms of molybdenum or tungsten, and a combination thereof.

5. The method according to claim 2, wherein the converted oxide precursor material is selected from the group consisting of a nano-grain sized compound of aluminium, titanium, silicon, vanadium, zirconium, niobium, hafnium, tantalum, chromium, molybdenum, or tungsten, and a combination thereof.

6. The method according to claim 2, wherein the converted oxide precursor material is a nano-grain sized elemental form of tungsten, molybdenum, or a combination or alloy thereof.

7. The method according to claim 1, wherein the ultrahard abrasive particles are treated in a surface treatment process in order to render the surfaces thereof vitreophilic.

8. The method according to claim 1, wherein the ultrahard abrasive particles are suspended in a liquid medium, and wherein a chemical reagent is introduced to form oxide precursor entities that bond to the surfaces of the respective particles and build up into coats on the particles.

9. The method according to claim 8, wherein the chemical reagent is at least one alkoxide or solution of the alkoxide(s) in an alcohol.

10. The method according to claim 9, wherein the alkoxide is an alkoxide of an element selected from the group consisting of aluminium, titanium, silicon, zirconium, vanadium, niobium, tantalum, chromium, molybdenum, tungsten, hafnium, and yttrium.

11. The method according to claim 8, wherein the alcohol has the same alkyl group as the alkoxide(s).

12. The method according to claim 8, wherein the liquid medium is an aliquot of water and alcohol.

13. The method according to claim 12, wherein two or more alkoxides are introduced into the liquid medium, wherein the two or more alkoxides are of elements selected from the group consisting of aluminium, titanium, silicon, zirconium, vanadium, niobium, tantalum, chromium, molybdenum, tungsten, hafnium, and yttrium.

14. The method according to claim 8, wherein the chemical reagent is an aliquot of water and alcohol.

15. The method according to claim 8, wherein the liquid medium is at least one alkoxide or solution of the alkoxide(s) in an alcohol.

16. The method according to claim 15, wherein the liquid medium comprises two or more alkoxides in an alcohol solution, wherein the two or more alkoxides are of elements selected from the group consisting of aluminium, titanium, silicon, zirconium, vanadium, niobium, tantalum, chromium, molybdenum, tungsten, hafnium, and yttrium.

17. The method according to claim. 15, wherein the alkoxide is an alkoxide of an element selected from the group consisting of aluminum, titanium, silicon, zirconium, vanadium, niobium, tantalum, chromium, molybdenum, tungsten, hafnium, and yttrium.

18. The method according to claim 8, wherein the chemical reagent or liquid medium is a solution of a mixed alkoxide compound or complex incorporating two or more elements selected from the group consisting of aluminium, titanium, silicon, zirconium, vanadium, niobium, tantalum, chromium, molybdenum, tungsten, hafnium, and yttrium.

19. The method according to claim 1, wherein the oxide precursor material coats are substantially micro-porous.

20. The method according to claim 9, wherein the coated ultrahard abrasive particles are subjected to temperature controlled heating in air, vacuum, or inert gas to remove volatiles and unwanted chemical species attached to the high surface area of the micro-porous, amorphous coats.

21. The method according to claim 20, wherein the coated ultrahard abrasive particles are subjected to further heat treatment or calcination to crystallize the coats to form fine grained or nano-size grained oxide ceramics.

22. The method according to claim 20, wherein the coated ultrahard abrasive particles are subjected to further heat treatment to vitrify the coats to form glasses.

23. The method according to claim 20, wherein the oxide coats are reduced by hydrogen and are converted into micro or nano-grain sized elements or metals.

24. The method according to claim 19, wherein the coated ultrahard abrasive particles are subjected to temperature controlled reactions in reactive gases to convert the coat materials into non-oxide ceramics or glasses.

25. The method according to claim 24, wherein nitrides are formed by reacting the coats with ammonia gas.

26. The method according to claim 24, wherein carbides are formed by reacting the coats in mixtures of carbonaceous gases and hydrogen.

27. The method according to claim 26, wherein the carbides are formed by reacting the coats in a mixture of methane or ethane and hydrogen.

28. The method according to claim 19, wherein the coated ultrahard abrasive particles are subjected to temperature controlled reactions in reactive gases to convert the coat materials into oxynitride or oxycarbide ceramics or glasses.

29. A coated ultrahard abrasive particulate material comprising diamond or cubic boron nitride particles of sub-micron or nano size with coats selected from the group consisting of nitrides of titanium, vanadium, niobium, tantalum, molybdenum, or tungsten, and carbides of vanadium, niobium, tantalum, molybdenum, or tungsten.

30. The coated ultrahard abrasive particulate material according to claim 29, wherein the coat thicknesses are less than 2 microns.

31. A coated ultrahard abrasive particulate material comprising diamond or cubic boron nitride particles of sub-micron or nano size with coats selected from the group consisting of anatase phase titania, rutile phase titania, tetragonal zirconia, monoclinic zirconia, zirconia stabilized with yttria or magnesia, the transient structures and alpha phase of alumina, and the oxides of vanadium, niobium, tantalum, hafnium, molybdenum, and tungsten.

32. The coated ultrahard abrasive particle material according to claim 31, wherein the coat thicknesses are less than 2 microns.

33. A coated ultrahard abrasive particulate material comprising diamond or cubic boron nitride particles of sub-micron or nano size coated with silica glass.

34. The coated ultrahard abrasive particle material according to claim 33, wherein the coat thicknesses are less than 2 microns.

35. A coated ultrahard abrasive particulate material comprising diamond or cubic boron nitride particles of sub-micron or nano size with coats selected from the group consisting of oxides of titanium, vanadium, niobium, tantalum, aluminium, silicon, molybdenum, or tungsten, nitrides or carbides of titanium, vanadium, niobium, tantalum, or molybdenum, and molybdenum or tungsten metal.

36. The coated ultrahard abrasive particle material according to claim 35, wherein the coat thicknesses are less than 2 microns.

\* \* \* \* \*